(12) United States Patent
Cheng et al.

(10) Patent No.: US 11,221,763 B2
(45) Date of Patent: Jan. 11, 2022

(54) DISK LOCK MANAGEMENT METHOD, APPARATUS, AND SYSTEM

(71) Applicant: Huawei Technologies Co., Ltd., Shenzhen (CN)

(72) Inventors: Jusheng Cheng, Beijing (CN); Jiufei Xue, Shenzhen (CN); Yiwen Jiang, Hangzhou (CN); Yibin Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

(21) Appl. No.: 16/379,472

(22) Filed: Apr. 9, 2019

(65) Prior Publication Data

US 2019/0235756 A1    Aug. 1, 2019

Related U.S. Application Data

(63) Continuation of application No. PCT/CN2017/103054, filed on Sep. 23, 2017.

(30) Foreign Application Priority Data

Oct. 13, 2016   (CN) .......................... 201610895164.4

(51) Int. Cl.
*G06F 3/06*       (2006.01)
*G06F 16/176*     (2019.01)
*G06F 9/52*       (2006.01)

(52) U.S. Cl.
CPC .............. *G06F 3/061* (2013.01); *G06F 3/067* (2013.01); *G06F 3/0634* (2013.01); *G06F 9/526* (2013.01); *G06F 16/1774* (2019.01)

(58) Field of Classification Search
CPC .... G06F 3/061; G06F 16/1774; G06F 3/0634; G06F 3/067; G06F 9/526
(Continued)

(56) References Cited

U.S. PATENT DOCUMENTS 6,052,684 A    4/2000  Du
6,145,006 A    11/2000 Vishlitsky et al.
(Continued)

FOREIGN PATENT DOCUMENTS

CN    101800763 A    8/2010
CN    103731485 A    4/2014
(Continued)

OTHER PUBLICATIONS

EP/17860127, Summons to Attend Oral Proceeding, Sep. 15, 2020.

*Primary Examiner* — Tauqir Hussain
(74) *Attorney, Agent, or Firm* — Leydig, Voit & Mayer, Ltd.

(57) ABSTRACT

A disk lock management method, apparatus, and system are disclosed. The method is performed by a first node, including: sending an obtaining request to a data storage system, where the obtaining request is used to request to obtain a disk lock; receiving a release request, where the release request is used to request the first node to release the disk lock; and sending, a release message to the data storage system, where the release message is used to release the disk lock. This method avoids frequent application and releasing operations performed on the disk lock, reduces disk IO resource occupancy caused by application and releasing of the disk lock, and improves overall system performance.

14 Claims, 9 Drawing Sheets

(58) Field of Classification Search
USPC .......................................................... 709/217
See application file for complete search history.

(56) References Cited

U.S. PATENT DOCUMENTS

| | | | |
|---|---|---|---|
| 6,725,370 B1* | 4/2004 | Sakakura | H04L 63/0428 |
| | | | 713/155 |
| 8,370,318 B2 | 2/2013 | Chan et al. | |
| 8,489,636 B2 | 7/2013 | Scales et al. | |
| 8,949,566 B2 | 2/2015 | Kandasamy et al. | |
| 9,130,821 B2 | 9/2015 | Rawat et al. | |
| 9,141,440 B2 | 9/2015 | Chopra | |
| 10,452,545 B1* | 10/2019 | Patidar | G06F 12/0868 |
| 2002/0004810 A1 | 1/2002 | Reneris | |
| 2006/0248127 A1* | 11/2006 | Whitehouse | G06F 9/526 |
| 2006/0271575 A1 | 11/2006 | Harris et al. | |
| 2009/0106248 A1 | 4/2009 | Vaghani et al. | |
| 2010/0017409 A1* | 1/2010 | Rawat | G06F 16/1774 |
| | | | 707/E17.007 |
| 2011/0106778 A1* | 5/2011 | Chan | G06F 16/2343 |
| | | | 707/704 |
| 2011/0179082 A1 | 7/2011 | Vaghani et al. | |
| 2011/0276690 A1 | 11/2011 | Whitehouse | |
| 2013/0019067 A1* | 1/2013 | Vilayannur | G06F 12/0815 |
| | | | 711/144 |
| 2013/0046951 A1* | 2/2013 | Jones | G06F 12/023 |
| | | | 711/171 |
| 2014/0237306 A1* | 8/2014 | Kabakura | H04L 41/0677 |
| | | | 714/712 |
| 2014/0365549 A1 | 12/2014 | Jenkins | |
| 2016/0210302 A1* | 7/2016 | Xia | G06F 3/1285 |
| 2017/0249223 A1* | 8/2017 | Sherlock | G06F 11/2094 |

FOREIGN PATENT DOCUMENTS

| | | |
|---|---|---|
| CN | 105208124 A | 12/2015 |
| CN | 105283838 A | 1/2016 |
| CN | 105426271 A | 3/2016 |
| CN | 106648909 A | 5/2017 |

* cited by examiner

DISK LOCK MANAGEMENT METHOD, APPARATUS, AND SYSTEM

CROSS-REFERENCE TO RELATED APPLICATIONS

This application is a continuation of International Application No. PCT/CN2017/103054, filed on Sep. 23, 2017, which claims priority to Chinese Patent Application No. 201610895164.4, filed on Oct. 13, 2016. The disclosures of the aforementioned applications are hereby incorporated by reference in their entireties.

TECHNICAL FIELD

Embodiments of the present disclosure relate to the computer field, and in particular, to a disk lock management method, apparatus, and system.

BACKGROUND

In a distributed system, a distributed lock is indispensable. There are a plurality of methods for implementing the distributed lock.

A disk lock is an implementation of the distributed lock. A node having a disk lock has permission to access a resource corresponding to the disk lock. The node writes a locking message or an unlocking message into a disk in a form of a small computer system interface (SCSI) command using a fiber channel storage area network (FC SAN) or an Internet Protocol storage area network (IP SAN), or reads a status of a lock from the disk in the form of the SCSI command using the FC SAN or the IP SAN, so as to determine whether to perform locking or unlocking.

The disk lock is stored in the disk. Each time lock information is to be refreshed, the disk is continuously read, and new lock information is written into the disk. Frequently refreshing the disk lock occupies a large quantity of disk input output (IO) resources. In a medium-sized distributed system, if all nodes continuously read lock information from a disk, and write lock information into the disk, a large quantity of IO resources are occupied by a disk lock, and system performance is greatly affected.

SUMMARY

In view of this, embodiments of the present disclosure disclose a disk lock management method, apparatus, and system, to perform an operation on a disk lock according to an actual requirement, thereby reducing frequent updating of the disk lock, and improving performance of a distributed system.

According to a first aspect, the present disclosure provides a disk lock management method, where a resource and a disk lock of the resource are stored in a data storage system, a node that occupies the disk lock has permission to access the resource, and the method includes: sending, by a first node, an obtaining request to the data storage system, where the obtaining request is used to request to obtain the disk lock; receiving, by the first node, a release request, where the release request is used to request the first node to release the disk lock; and sending, by the first node, a release message to the data storage system, where the release message is used to release the disk lock.

With reference to the first aspect, in a first possible implementation of the first aspect, the receiving, by the first node, a release request includes: receiving, by the first node, the release request from a second node, where the second node is a node that is to request to obtain the disk lock.

If the first node and the second node are interconnected, when the second node needs to access the resource, the second node may directly send the release request to the first node, to request the first node to release the disk lock of the resource.

With reference to the first possible implementation of the first aspect, in a second possible implementation of the first aspect, after the sending, by the first node, a release message to the data storage system, the method further includes: sending, by the first node, an acknowledgement message to the second node, where the acknowledgement message is used to indicate that the first node has already released the disk lock.

After releasing the disk lock, the first node may send the acknowledgement message to the second node, to indicate that the disk lock has already been released; and after receiving the acknowledgement message, the second node may apply for the disk lock, to obtain permission to access the resource.

With reference to any one of the first aspect or the foregoing possible implementations of the first aspect, in a third possible implementation of the first aspect, the receiving, by the first node, a release request includes: receiving, by the first node, the release request from the data storage system.

When the second node and the first node are not interconnected, the data storage system may send the release request to the first node, such that the first node releases the disk lock.

With reference to any one of the first aspect or the foregoing possible implementations of the first aspect, in a fourth possible implementation of the first aspect, before the sending, by the first node, a release message to the data storage system, the method further includes: determining, by the first node, that a time of occupying the disk lock by the first node is greater than a preset threshold.

To avoid frequent lock application and lock releasing, a preset time threshold be may set for each node; and only when a time of occupying the disk lock by a node is greater than the preset threshold, the disk lock is released.

With reference to any one of the first aspect or the foregoing possible implementations of the first aspect, in a fifth possible implementation of the first aspect, the disk lock includes an occupancy field, the occupancy field is used to record the node that occupies the disk lock, the obtaining request carries an identifier of the first node, and the obtaining request is used to write the identifier of the first node into the occupancy field of the disk lock.

According to a second aspect, the present disclosure provides a disk lock management method, where a resource and a disk lock of the resource are stored in a data storage system, the disk lock includes an occupancy field, the occupancy field is used to record a node that occupies the disk lock, the node that occupies the disk lock has permission to access the resource, and the method includes: reading, by a second node, the disk lock; determining, by the second node based on the occupancy field of the read disk lock, that the disk lock is occupied by a first node; and sending, by the second node, a release request to the first node, where the release request is used to request the first node to release the disk lock.

With reference to the second aspect, in a first possible implementation of the second aspect, after the sending, by the second node, a release request to the first node, the method further includes: receiving, by the second node, an acknowledgement message sent by the first node, where the acknowledgement message is used to indicate that the first node has already released the disk lock.

After releasing the disk lock, the first node may proactively notify the second node of obtaining the message; and after obtaining the acknowledgement message, the second node may apply for the disk lock. This can prevent the second node from frequently performing an operation of confirming a status of the disk lock.

With reference to the second aspect or the first possible implementation of the second aspect, in a second possible implementation of the second aspect, after the sending, by the second node, a release request to the first node, the method further includes: sending, by the second node, an obtaining request to the data storage system, where the obtaining request is used to request to obtain the disk lock.

According to a third aspect, the present disclosure provides a readable medium, including an executable instruction. When a processor of a computing device executes the executable instruction, the computing device performs the method in any one of the foregoing aspects or the possible implementations of the foregoing aspects.

According to a fourth aspect, the present disclosure provides a computing device, including a processor, a memory, and a bus, where the memory is configured to store an executable instruction; the processor and the memory are connected using the bus; and when the computing device runs, the processor executes the executable instruction stored in the memory, such that the computing device performs the method in any one of the foregoing aspects or the possible implementations of the foregoing aspects.

According to a fifth aspect, the present disclosure provides a disk lock management apparatus, where a resource and a disk lock of the resource are stored in a data storage system, a node that occupies the disk lock has permission to access the resource, and the apparatus includes: a sending unit, configured to send an obtaining request to the data storage system, where the obtaining request is used to request to obtain the disk lock; and a receiving unit, configured to receive a release request, where the release request is used to request a first node to release the disk lock. The sending unit is further configured to send a release message to the data storage system, where the release message is used to release the disk lock.

With reference to the fifth aspect, in a first possible implementation of the fifth aspect, the receiving unit is configured to receive the release request from a second node, where the second node is a node that is to request to obtain the disk lock.

With reference to the first possible implementation of the fifth aspect, in a second possible implementation of the fifth aspect, after sending the release message to the data storage system, the sending unit is further configured to send an acknowledgement message to the second node, where the acknowledgement message is used to indicate that the first node has already released the disk lock.

With reference to the fifth aspect, in a third possible implementation of the fifth aspect, the receiving unit is configured to receive the release request from the data storage system.

With reference to any one of the fifth aspect or the foregoing possible implementations of the fifth aspect, in a fourth possible implementation of the fifth aspect, the apparatus further includes a determining unit, and before the sending unit sends the release message to the data storage system, the determining unit is configured to determine that a time of occupying the disk lock by the first node is greater than a preset threshold.

With reference to any one of the fifth aspect or the foregoing possible implementations of the fifth aspect, in a fifth possible implementation of the fifth aspect, the disk lock includes an occupancy field, the occupancy field is used to record the node that occupies the disk lock, the obtaining request carries an identifier of the first node, and the obtaining request is used to write the identifier of the first node into the occupancy field of the disk lock.

The fifth aspect is an apparatus implementation corresponding to the method in the first aspect, and descriptions in any one of the first aspect or the possible implementations of the first aspect are correspondingly applicable to any one of the fifth aspect or the possible implementations of the fifth aspect. Details are not described herein again.

According to a sixth aspect, the present disclosure provides a disk lock management apparatus, where a resource and a disk lock of the resource are stored in a data storage system, the disk lock includes an occupancy field, the occupancy field is used to record a node that occupies the disk lock, the node that occupies the disk lock has permission to access the resource, and the apparatus includes: a reading unit, configured to read the disk lock; a determining unit, configured to determine, based on the occupancy field of the read disk lock, that the disk lock is occupied by a first node; and a sending unit, configured to send a release request to the first node, where the release request is used to request the first node to release the disk lock.

With reference to the sixth aspect, in a first possible implementation of the sixth aspect, the apparatus further includes a receiving unit, and after the sending unit sends the release request to the first node, the receiving unit is configured to receive an acknowledgement message sent by the first node, where the acknowledgement message is used to indicate that the first node has already released the disk lock.

With reference to the sixth aspect or the first possible implementation of the sixth aspect, in a second possible implementation of the sixth aspect, after sending the release request to the first node, the sending unit is further configured to send an obtaining request to the data storage system, where the obtaining request is used to request to obtain the disk lock.

The sixth aspect is an apparatus implementation corresponding to the method in the second aspect, and descriptions in any one of the second aspect or the possible implementations of the second aspect are correspondingly applicable to any one of the sixth aspect or the possible implementations of the sixth aspect. Details are not described herein again.

According to a seventh aspect, the present disclosure provides a disk lock management system, where the system includes a first node and a data storage system; the data storage system is configured to store a resource and a disk lock of the resource, where the disk lock includes an occupancy field, the occupancy field is used to record a node that occupies the disk lock, and the node that occupies the disk lock has permission to access the resource; and the first node is configured to: send an obtaining request to the data storage system, where the obtaining request is used to request to obtain the disk lock; receive a release request, where the release request is used to request the first node to release the disk lock; and send a release message to the data storage system, where the release message is used to release the disk lock.

With reference to the seventh aspect, in a first possible implementation of the seventh aspect, the system further includes a second node, the second node is a node that is to request to obtain the disk lock, and the first node is configured to receive the release request sent by the second node.

With reference to the first possible implementation of the seventh aspect, in a second possible implementation of the seventh aspect, after sending the release message to the data storage system, the first node is further configured to send an acknowledgement message to the second node, where the acknowledgement message is used to indicate that the first node has already released the disk lock.

With reference to the seventh aspect, in a third possible implementation of the seventh aspect, the first node is configured to receive the release request from the data storage system.

With reference to any one of the seventh aspect or the foregoing possible implementations of the seventh aspect, in a fourth possible implementation of the seventh aspect, before sending the release message to the data storage system, the first node is further configured to determine that a time of occupying the disk lock by the first node is greater than a preset threshold.

With reference to any one of the seventh aspect or the foregoing possible implementations of the seventh aspect, in a fifth possible implementation of the seventh aspect, the disk lock includes the occupancy field, the occupancy field is used to record the node that occupies the disk lock, the obtaining request carries an identifier of the first node, and the obtaining request is used to write the identifier of the first node into the occupancy field of the disk lock.

The seventh aspect is a system implementation corresponding to the methods in the first aspect and the second aspect, and descriptions in any one of the first aspect, the second aspect, the possible implementations of the first aspect, or the possible implementations of the second aspect are correspondingly applicable to any one of the seventh aspect or the possible implementations of the seventh aspect. Details are not described herein again.

According to the technical solutions disclosed in the embodiments of the present disclosure, according to a hot spot phenomenon that occurs when a node accesses a resource, after completing a current access operation, the first node does not immediately release the obtained disk lock, but continuously occupies the disk lock. When the second node needs to obtain the disk lock, the first node that occupies the disk lock receives the release request, and releases the disk lock according to the release request, such that the second node is to use the disk lock. This avoids frequent application and releasing operations performed on the disk lock, reduces disk IO resource occupancy caused by application and releasing of the disk lock, and improves overall system performance.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following describes the embodiments of the present disclosure with reference to accompanying drawings.

In a distributed system, when a node accesses a resource, a hot spot phenomenon usually occurs. To be specific, in a particular time, a node frequently accesses a particular resource. In an existing mechanism, when a node needs to access a resource, the node needs to apply, to a storage device storing the resource, for a disk lock (which may also be referred to as a lock in the following descriptions) corresponding to the resource, and release the disk lock corresponding to the resource after an operation of accessing the resource is terminated. When the node needs to re-access the resource, the node needs to re-apply to the storage device for the disk lock. If the node needs to frequently access the resource in a particular time, the node needs to frequently perform a procedure of applying for the disk lock and releasing the disk lock. IO resources of the storage device need to be occupied each time the disk lock is applied for and released. If resource access is not managed properly, a refreshment operation performed by the node on the disk lock occupies a large quantity of IO resources of the storage device. This greatly affects overall performance of the distributed system.

Figure 1:
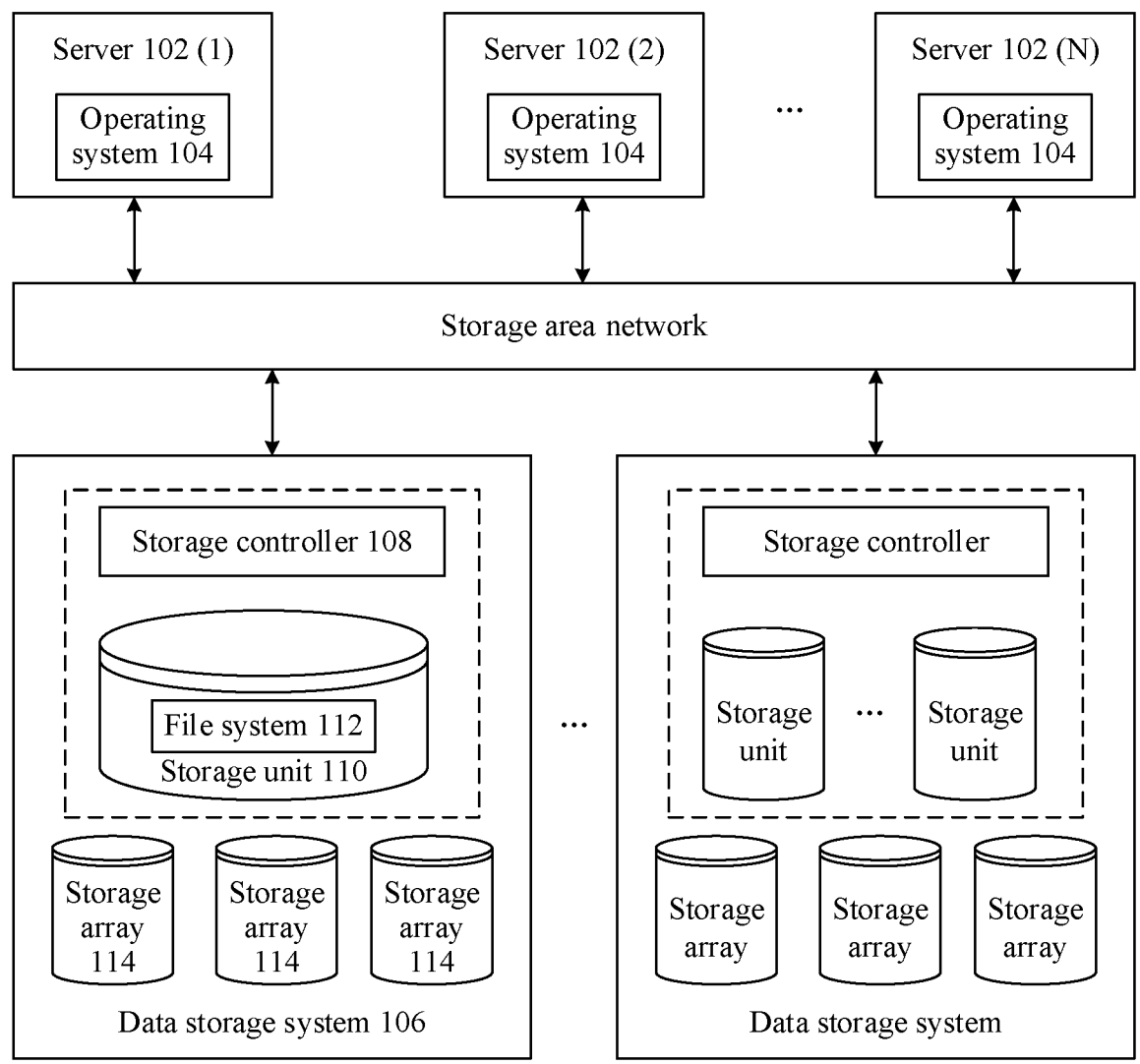
FIG. 1 is a schematic logical structural diagram of a distributed system.

FIG. 1 is a schematic logical structural diagram of a shared-file system. The shared-file system in FIG. 1 includes a plurality of servers 102. Each server 102 and a storage area network (SAN) are interconnected. In the following description, a server 102 is referred to as a node. An operating system 104 running on a server 102 interacts with a shared-file system 112 using the SAN, to implement an operation of accessing data stored in a storage unit 110. Specifically, the storage unit 110 may be a logic unit number (LUN) of a data storage system 106 interconnecting with the SAN. The storage unit 110 is presented to the operating system 104 in a form of continuous logical storage space using a storage controller 108. However, data accessed by the operating system 104 using the file system 112 may be actually stored in discontinuous physical storage space in a storage array 114.

Data stored in the storage unit 110 is accessed and stored in a form supported by the shared-file system 112. For example, the data stored in the storage unit 110 may be organized in a form of a file that is shared by different servers 102.

Figure 2:
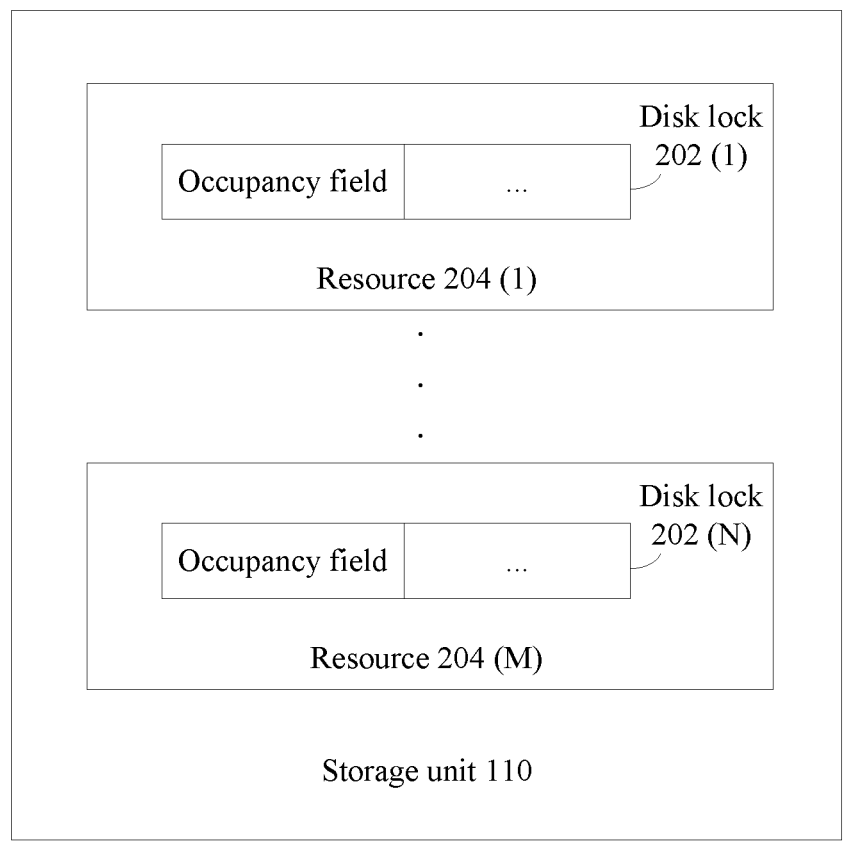
FIG. 2 is a data structure of a disk lock according to an embodiment of the present disclosure.

FIG. 2 shows a data structure of a disk lock. As shown in FIG. 2, in a storage unit 110, data is divided into a plurality of resources 204, each resource 204 corresponds to a disk lock 202, and the resource 204 may be organized by a file system 112 in a form of a file. Each disk lock 202 includes an occupancy field. The occupancy field is used to record an identifier of a node that is currently occupying the disk lock 202. The node that occupies the disk lock 202 has permission to access a resource 204 corresponding to the disk lock 202. If configuration data of a resource 204 needs to be changed, a node first needs to obtain a disk lock 202 corresponding to the resource 204. The node may be any entity, for example, may be a server 102 that is shown in FIG. 1 and that shares a resource with another node.

Optionally, each disk lock 202 further includes a waiting field. The waiting field is used to record an identifier of a node that is currently waiting to occupy the disk lock. When a system has a plurality of nodes that preempt a lock of a same resource at the same time, a lock holder succeeds in preempting the lock immediately after releasing the lock, resulting in that another node cannot obtain the lock in a long time, and that a maximum read and write delay is especially long, and affecting an upper-layer application. Therefore, a waiting field is added; and after the current lock holder releases the lock, only a node recorded in the waiting field has permission to obtain the disk lock. In a specific implementation process, the waiting field may be a waiting queue, and may be used to record a plurality of waiting nodes. The nodes obtain the disk lock based on a sequence recorded in the waiting queue. To be specific, after the lock holder releases the disk lock, a node that ranks first in the waiting queue has permission to obtain the disk lock. For ease of description, in the following description, that only one node identifier is recorded in the waiting field is used as an example for description in this embodiment of the present disclosure. However, it should be understood that a quantity of waiting nodes recorded in the waiting field is not limited in this embodiment of the present disclosure.

A node identifier is used to indicate a node that occupies the disk lock 202. For example, a special identity identifier (ID) may be allocated to each node, and the ID is written into the occupancy field of the disk lock 202, to indicate that the node corresponding to the ID occupies the disk lock 202. The ID may be manually set, or may be an Internet Protocol (IP) address of a server, a Media Access Control (MAC) address of the server, or a universally unique identifier (UUID) of the server. A form of the node identifier is not limited in this embodiment of the present disclosure.

The occupancy field of the disk lock 202 may be set to 0 or another special identifier, indicating that no node currently occupies the disk lock 202. The waiting field may also be set to 0 or another special identifier, indicating that no node currently waits to occupy the disk lock 202. In the following description, for ease of description, the occupancy field is set to 0, indicating that no node currently occupies the disk lock 202, and the waiting field is set to 0, indicating that no node currently waits to occupy the disk lock 202. However, it should be understood that a representation form for indicating that the disk lock 202 is currently not occupied is not limited in this embodiment of the present disclosure.

Optionally, the disk lock 202 may further include a lock type field. The lock type field is used to record a type of the disk lock 202. A lock type is used to indicate permission of accessing, by another node, the resource 204 corresponding to the disk lock 202 when a node occupies the disk lock 202. For example, the lock type may be used to indicate whether another node is allowed to perform a read operation on the resource 204.

A node may communicate with a data storage system using a small computer system interface (SCSI) protocol. In a SCSI protocol stack, there is a SCSI compare and write protocol. Main functions of the protocol are to first compare data, and then write the data if the data is consistent after comparison. The data storage system receives both old data and new data using the SCSI protocol. The old data is data that is previously read by the node from the data storage system, and the new data is data that is sent by the node and that needs to be written into the data storage system. After receiving both the old data and the new data, the data storage system first compares the old data with data stored in the data storage system. If the old data is the same as the data stored in the data storage system, the data storage system allows the new data to be written into the data storage system. If the old data is different from the data currently stored in the data storage system, the data storage system does not allow the new data to be written into the data storage system.

When requesting or releasing the disk lock, the node needs to add, to an instruction, an old value of the disk lock and a new value to be written into the disk lock. Only when the added old value is the same as an old value recorded in the disk lock, the new value is allowed to be written into the disk lock.

Figure 3:
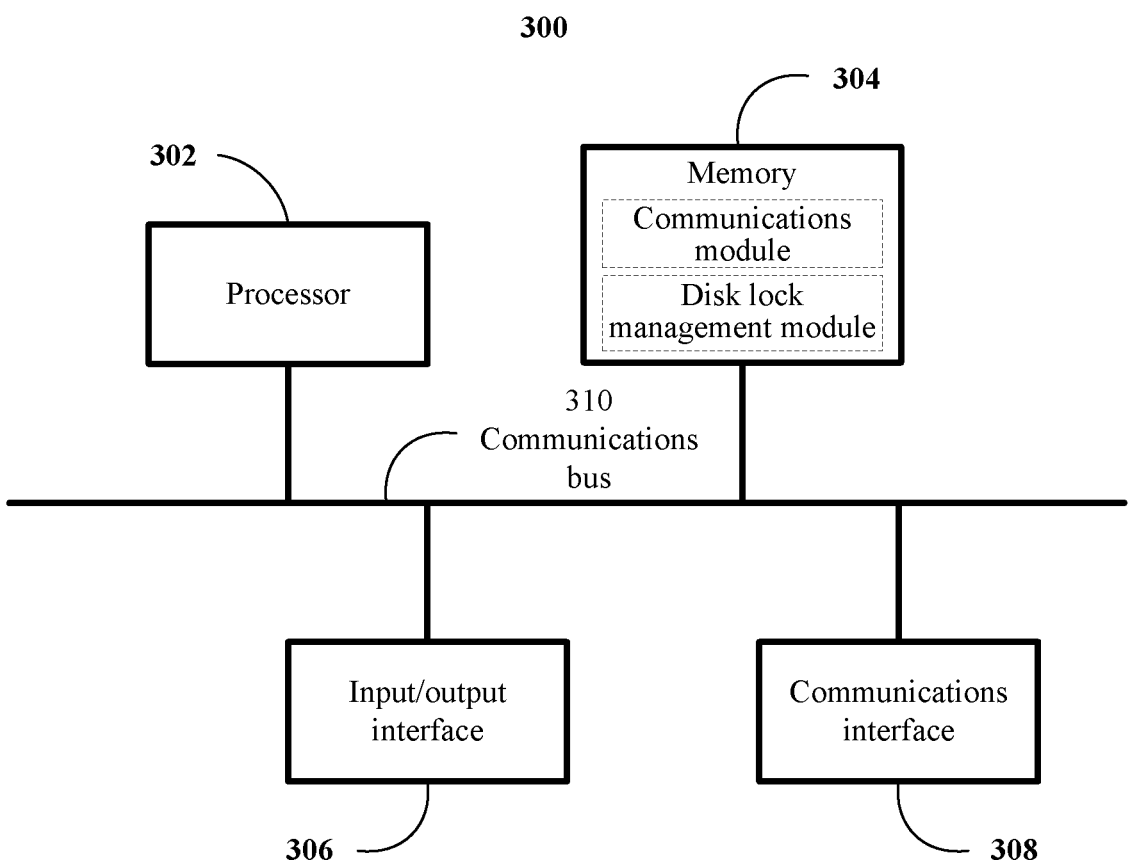
FIG. 3 is a schematic diagram of a hardware structure of a node according to an embodiment of the present disclosure.

FIG. 3 is a schematic diagram of a hardware structure of a node 300 according to an embodiment of the present disclosure. As shown in FIG. 3, the node 300 includes a processor 302, a memory 304, an input/output interface 306, a communications interface 308, and a bus 310. Communication connections between the processor 302, the memory 304, the input/output interface 306, and the communications interface 308 are implemented using the bus 310.

The processor 302 is a control center of the node 300, and is configured to execute a related program, to implement the technical solutions provided in the embodiments of the present disclosure. The processor 302 may be a general-purpose central processing unit (CPU), a microprocessor, an application-specific integrated circuit (ASIC), or one or more integrated circuits, and is configured to execute the related program, to implement the technical solutions provided in the embodiments of the present disclosure. Unless otherwise specified, in the present disclosure, a component configured to perform a particular function, for example, the processor 302 or the memory 304, may be implemented by configuring a general-purpose component to perform the corresponding function, or may be implemented using a dedicated component that dedicatedly performs the particular function. This is not limited in the present disclosure.

The memory 304 may be a read only memory (ROM), a static storage device, a dynamic storage device, or a random access memory (RAM). The memory 304 may store an operating system and another application program. When software or firmware is used to implement the technical solutions provided in the embodiments of the present disclosure, program code used to implement the technical solutions provided in the embodiments of the present disclosure is stored in the memory 304, and is executed by the processor 302. The memory 304 may be integrated with the processor 302 or integrated inside the processor 302, or may be one or more storage units independent of the processor 302.

The program code executed by the processor 302 may be stored in the memory 304 connected to the processor 302. Optionally, the memory 304 is a RAM, and program code (such as a communications module or a disk lock management module) stored in a hard disk is copied into the memory 304, such that the processor 302 executes the program code.

As shown in FIG. 3, the memory 304 of the node 300 includes a disk lock management module, and the processor 302 executes the disk lock management module program code, to implement disk lock management.

The input/output interface 306 is configured to: receive input data and information, and output data such as an operation result.

The communications interface 308 uses a transceiver apparatus such as, but not limited to, a transceiver, to implement communication between the node 300 and another device or a communications network.

The bus 310 may include a channel, used to transfer information between components (such as the processor 302, the memory 304, the input/output interface 306, and the communications interface 308) of the node 300.

It should be noted that although only the processor 302, the memory 304, the input/output interface 306, the communications interface 308, and the bus 310 are shown in the node 300 shown in FIG. 3, in a specific implementation process, a person skilled in the art should understand that the node 300 further includes another device necessary for implementing normal running. In addition, based on a specific requirement, a person skilled in the art should understand that the node 300 may further include a hardware device implementing another additional function. In addition, a person skilled in the art should understand that the node 300 may also merely include a device necessary for implementing the embodiments of the present disclosure, instead of including all devices shown in FIG. 3.

The hardware structure shown in FIG. 3 and the foregoing descriptions are applicable to various disk lock management apparatuses and systems that are provided in the embodiments of the present disclosure, and are applicable to performing various disk lock management methods provided in the embodiments of the present disclosure.

Figure 4:
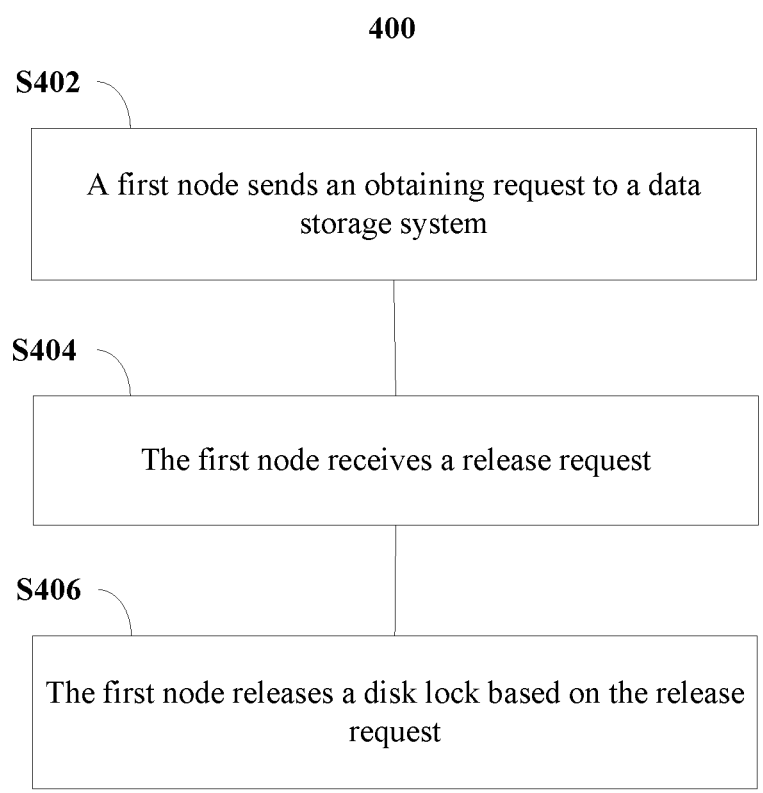
FIG. 4 is an example flowchart of a disk lock management method according to an embodiment of the present disclosure.

FIG. 4 is an example flowchart of a disk lock management method according to an embodiment of the present disclosure. A resource and a disk lock of the resource are stored in a data storage system, an occupancy field of the disk lock is used to record a node that occupies the disk lock, and the node that occupies the disk lock has permission to access the resource. As shown in FIG. 4, the method includes the following steps.

S402. A first node sends an obtaining request to the data storage system, where the obtaining request is used to request to obtain the disk lock of the resource.

Before the first node sends the obtaining request to the data storage system, the method further includes: reading, by the first node, the disk lock of the resource, and determining, based on the read disk lock, that the disk lock of the resource is not occupied by another node. Specifically, the first node determines, based on the occupancy field of the disk lock, whether the disk lock is currently occupied by the another node. If the occupancy field of the disk lock is 0, it indicates that the disk lock is currently not occupied by the another node.

Specifically, the obtaining request carries an identifier of the first node. The obtaining request is used to write the identifier of the first node into the occupancy field of the disk lock, to indicate that the disk lock is occupied by the first node.

More specifically, the obtaining request further carries an old value (that is, 0) of the occupancy field of the disk lock read by the first node. After receiving the obtaining request, the data storage system compares the old value carried in the obtaining request with a value currently stored in the occupancy field of the disk lock. If the two values are the same, it indicates that no other nodes change the value of the occupancy field of the disk lock at an interval between reading the disk lock by the first node and sending the obtaining request by the first node, and the data storage system writes the identifier of the first node into the occupancy field of the disk lock. If the two values are different, it indicates that another node changes the value of the occupancy field of the disk lock before the first node sends the obtaining request, and the data storage system does not allow the first node to write the identifier of the first node into the occupancy field of the disk lock.

S404. The first node receives a release request, where the release request is used to request the first node to release the disk lock.

In a distributed file system, a hot spot phenomenon occurs when a node accesses data. To be specific, in a particular time period, the first node may frequently access the resource. After one access is terminated, if the first node immediately releases the disk lock, the first node needs to frequently apply for the disk lock and release the disk lock in the particular time period. These operations of requesting the disk lock and releasing the disk lock occupy a large quantity of disk IO resources, affecting normal data access. Therefore, in this embodiment of the present disclosure, after the first node obtains the disk lock through application and completes one access operation, the first node does not immediately release the disk lock, but continues to occupy the disk lock, to avoid repeating disk lock application and releasing operations subsequently.

In a possible implementation of this embodiment of the present disclosure, the first node and a second node are interconnected. The first node receives the release request from the second node. The second node is a node that is to request to obtain the disk lock.

Because the first node continuously occupies the disk lock of the resource, when the second node also needs to access the resource, the second node needs to determine whether the disk lock is occupied by another node. Specifically, the second node reads the disk lock of the resource, and determines, based on the read disk lock, whether the disk lock is currently occupied by the another node. Because the first node does not release the disk lock after terminating an access operation, the second node determines, based on the read disk lock, that the disk lock is occupied by the first node. More specifically, the second node determines, based on information recorded in the occupancy field of the disk lock, that the first node is currently occupying the disk lock.

After the second node determines that the first node is currently occupying the disk lock, the second node sends the release request to the first node. The release request is used to request the first node to release the disk lock.

In another possible implementation of this embodiment of the present disclosure, the first node receives the release request from the data storage system. For example, when no network interconnection exists between the first node and a second node, the second node cannot directly send the release request to the first node, and the data storage system sends the release request to the first node.

Specifically, when the second node needs to access the resource, the second node first reads the disk lock of the resource, and determines, based on the read disk lock, whether the disk lock is currently occupied by another node. Because the first node does not release the disk lock after terminating an access operation, the second node determines, based on the read disk lock, that the disk lock is occupied by the first node, and the second node triggers the data storage system to send the release request to the first node. The release request is used to request the first node to release the disk lock.

S406. The first node releases the disk lock based on the received release request.

Specifically, after receiving the release request, the first node first determines whether the first node is performing an access operation on the resource. If the first node is performing the access operation on the resource, the first node continues to occupy the disk lock before the access operation that is being performed is terminated.

If the first node is currently not performing the access operation on the resource, the first node releases the disk lock after receiving the release request. If the first node is performing the access operation on the resource, the first node releases the disk lock after the access operation that is being performed is terminated.

After receiving the release request, the first node may directly release the disk lock when no access operation is currently being performed on the resource or after the access operation that is currently being performed on the resource is terminated.

Optionally, after determining that a time of occupying the disk lock by the first node is greater than a preset threshold, the first node releases the disk lock. To prevent frequent lock operations and sharp degradation of performance that are caused by frequent switching of the disk lock between nodes, a shortest holding time of a lock may be set for the nodes. Only when an actual holding time of the lock is greater than the shortest holding time, a node that holds the lock releases the lock. More specifically, the shortest holding time of the lock may be dynamically set. If the shortest holding time of the lock is set to 0, after receiving the release request, the first node immediately releases the lock if the first node does not need to continue to use the lock. If the shortest holding time of the lock is not set to 0, the first node can release the lock only after the first node holds the lock for the shortest time.

In a specific implementation process, the first node releases the disk lock by sending a release message to the data storage system. The release message is used to delete the identifier, recorded in the occupancy field of the disk lock, of the first node. More specifically, the release message carries the identifier of the first node and an identifier 0. After receiving the release message, the data storage system compares the node identifier carried in the release message with the node identifier recorded in the occupancy field of the disk lock. If the two node identifiers are the same, the data storage system releases the disk lock occupied by the first node, and 0 is written into the occupancy field of the disk lock.

Optionally, after the second node sends the release request to the first node, the second node rereads the disk lock. If a value of the occupancy field of the disk lock is found to be 0, it indicates that the first node has already released the occupied disk lock, and the second node sends an obtaining request to the data storage system. The obtaining request carries an identifier of the second node. More specifically, the obtaining request sent by the second node further carries an old value 0 that is previously read by the second node from the occupancy field of the disk lock. The data storage system compares the old value carried in the obtaining request sent by the second node with the value currently recorded in the occupancy field of the disk lock. If the two values are the same, it indicates that no other nodes occupy the disk lock in advance, and the identifier of the second node is allowed to be written into the occupancy field of the disk lock.

Optionally, after sending the release message to the data storage system, the first node may further send an acknowledgement message to the second node. The acknowledgement message is used to indicate that the first node has already released the disk lock. After receiving the acknowledgement message, the second node may read the disk lock, and determine that no other nodes currently occupy the disk lock.

To avoid a phenomenon that a node cannot obtain the disk lock all the time due to frequent lock contention, the disk lock may further include a waiting field. The waiting field is used to record a node that waits to occupy the disk lock. After a node that is occupying the disk lock releases the disk lock, only a node that is recorded in the waiting field of the disk lock has permission to obtain the disk lock. After receiving a new obtaining request, the data storage system compares a node identifier carried in the obtaining request with a node identifier recorded in the waiting field. If the two node identifiers are the same, it indicates that a node sending the obtaining request has permission to obtain the disk lock, the node identifier carried in the obtaining request is written into the occupancy field, and a value of the waiting field is set to 0. When the second node determines, based on the occupancy field of the disk lock, that the first node is occupying the disk lock, the second node may request the data storage system, to write the identifier of the second node into the waiting field of the disk lock. After the first node releases the disk lock, the second node has permission to obtain the disk lock. After the second node sends the obtaining request to the data storage system, and after the data storage system determines that both the node identifier in the obtaining request and the node identifier in the waiting field are the identifier of the second node, the data storage system writes the identifier of the second node into the occupancy field, and sets the waiting field to 0.

In another implementation of this embodiment of the present disclosure, after obtaining the disk lock, the first node releases the disk lock based on a preset time period, to avoid frequent request for and releasing of the disk lock.

According to the technical solution disclosed in this embodiment of the present disclosure, according to the hot spot phenomenon that occurs when a node accesses a resource, after completing the current access operation, the first node does not immediately release the obtained disk lock, but continuously occupies the disk lock. When the second node needs to obtain the disk lock, the first node that occupies the disk lock receives the release request, and releases the disk lock according to the release request, such that the second node is to use the disk lock. This avoids frequent application and releasing operations performed on the disk lock, reduces disk IO resource occupancy caused by application and releasing of the disk lock, and improves overall system performance.

Figure 5:
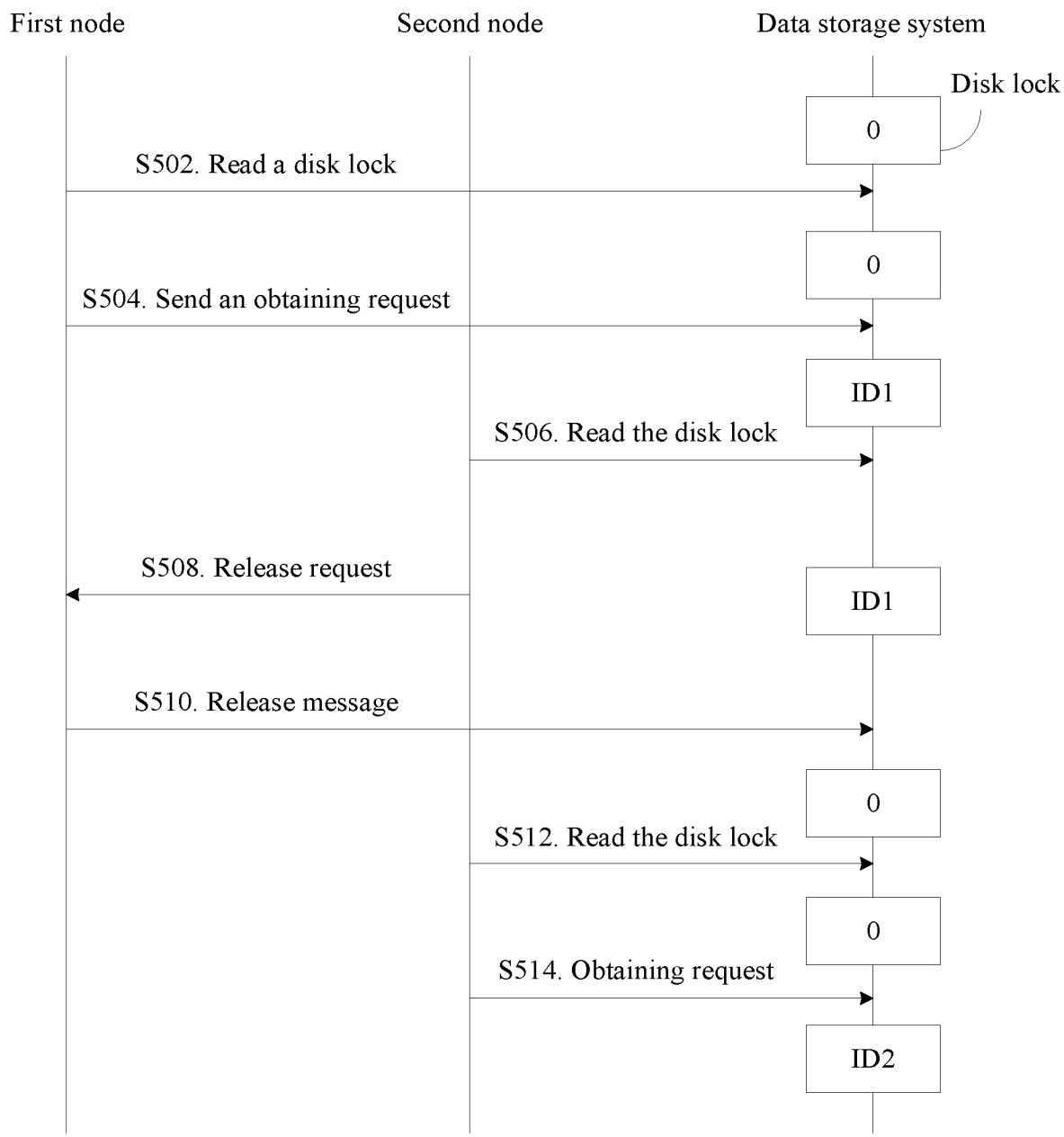
FIG. 5 is an example signaling diagram of a disk lock management method according to an embodiment of the present disclosure.

FIG. 5 is an example signaling diagram of a disk lock management method according to an embodiment of the present disclosure. As shown in FIG. 5, the procedure includes the following steps.

S502. A first node reads a disk lock of a to-be-accessed resource from a data storage system.

When the first node needs to access a resource, the first node needs to obtain a disk lock of the resource. If no other nodes currently occupy the disk lock, a value of an occupancy field of the disk lock is 0. The first node determines, based on the value of the occupancy field of the read disk lock, that no other nodes currently occupy the disk lock.

S504. The first node sends an obtaining request to the data storage system.

The obtaining request sent by the first node carries an old value 0 of the occupancy field read in step S502 and a node identifier ID1 of the first node.

After receiving the obtaining request sent by the first node, the data storage system first compares the old value carried in the obtaining request with a current value of the occupancy field. If the two values are the same, it indicates that no other nodes obtain the disk lock at an interval between step S502 and step S504, and the data storage system writes the identifier ID1 of the first node into the occupancy field of the disk lock, indicating that the first node occupies the disk lock.

S506. A second node reads the disk lock from the data storage system.

Because a hot spot phenomenon occurs when a node accesses a resource, the first node does not proactively release the disk lock after obtaining the disk lock. When the second node needs to access the resource, the second node needs to obtain the disk lock of the resource. Because the first node currently occupies the disk lock, the identifier of the first node is recorded in the occupancy field of the disk lock. After the second node reads the disk lock, the second node determines, based on identifier information that is of the first node and that is recorded in the occupancy field of the read disk lock, that the first node currently occupies the disk lock.

S508. The second node sends a release request to the first node, where the release request is used to request the first node to release the disk lock.

The second node determines, based on the occupancy field of the read disk lock, that the first node currently occupies the disk lock. Because the first node does not proactively release the disk lock, the second node needs to send the release request to the first node, to obtain the disk lock.

S510. The first node sends a release message to the data storage system, where the release message is used to release the disk lock occupied by the first node.

After receiving the release request sent by the second node, the first node determines whether an access operation is currently being performed on the resource corresponding to the disk lock. If an access operation is being performed on the resource, the first node continuously occupies the disk lock, and releases the disk lock until the access operation that is currently being performed on the resource is completed. If no access operation is currently being performed on the resource, the first node releases the disk lock. Optionally, to avoid frequent switching of the lock, before releasing the disk lock, the first node further determines that a time of occupying the disk lock by the first node is greater than a preset threshold.

Specifically, the release message carries the identifier of the first node and an identifier 0. After receiving the release message, the data storage system compares the identifier of the first node carried in the release message with an identifier currently recorded in the occupancy field of the disk lock. If the two identifiers are the same, the identifier 0 is written into the occupancy field of the disk lock, indicating that no node occupies the disk lock.

S512. The second node reads the disk lock from the data storage system.

The second node may read the disk lock based on a constant period, and determine whether the first node has already released the disk lock. If the identifier in the occupancy field of the disk lock read by the second node is 0, it indicates that the first node has already successfully released the disk lock.

S514. The second node sends an obtaining request to the data storage system, where the obtaining request is used to obtain the disk lock.

After determining that the first node releases the disk lock, the second node sends the obtaining request to the data storage system. Specifically, the obtaining request sent by the second node carries an identifier of the second node and an old value 0 read by the second node from the occupancy field of the disk lock. After receiving the obtaining request sent by the second node, the data storage system compares the old value 0 carried in the obtaining request sent by the second node with the value recorded in the occupancy field of the disk lock. If the two values are the same, it indicates that no other nodes currently occupy the disk lock after the first node releases the disk lock, and the data storage system writes the identifier of the second node into the occupancy field of the disk lock, indicating that the second node occupies the disk lock.

Optionally, the disk lock further includes a waiting field. The waiting field is used to record a node that is waiting to obtain the disk lock. For example, after reading the disk lock, the second node finds that the first node is occupying the disk lock. If an identifier recorded in the waiting field of the disk lock is 0, the second node may request the data storage system, to write the identifier of the second node into the waiting field. Subsequently, after receiving the obtaining request of the second node, the data storage system further compares the identifier of the second node with the identifier recorded in the waiting field of the disk lock. If the two identifiers are the same, the data storage system allows the identifier of the second node to be written into the occupancy field, and sets the waiting field to 0.

Figure 6:
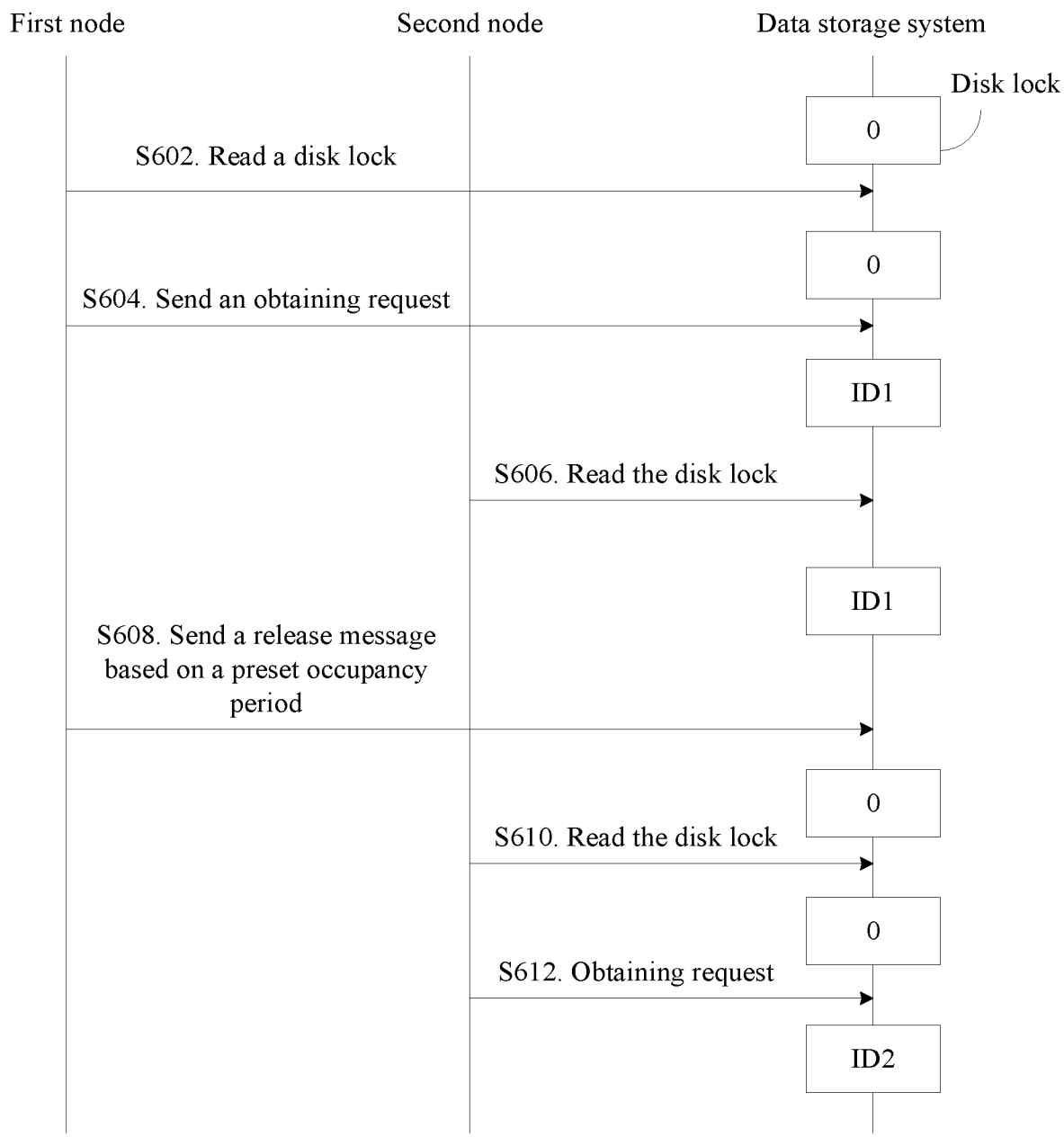
FIG. 6 is an example signaling diagram of a disk lock management method according to an embodiment of the present disclosure.

FIG. 6 is an example signaling diagram of a disk lock management method according to an embodiment of the present disclosure. As shown in FIG. 6, the procedure includes the following steps.

For step S602 to step S606, refer to descriptions in step S502 to step S506. Details are not described herein again.

S608. The first node sends a release message to the data storage system based on a preset occupancy period.

To avoid frequent lock request and lock releasing operations, after completing an access operation, the first node does not immediately release an obtained disk lock, but releases the disk lock based on the preset occupancy period. The first node maintains a time of occupying the disk lock, and releases the disk lock after the time reaches the preset occupancy period.

For specific descriptions of the release message, refer to the embodiment in FIG. 5. Details are not described herein again.

S610. The second node reads the disk lock.

The second node may read the disk lock based on a preset period. After the first node releases the disk lock, the disk lock read by the second node shows that an occupancy field of the disk lock is 0, indicating that no node currently occupies the disk lock.

S612. The second node sends an obtaining request to the data storage system.

For specific descriptions of step S610 and step S612, refer to step S512 and step S514. Details are not described herein again.

Figure 7:
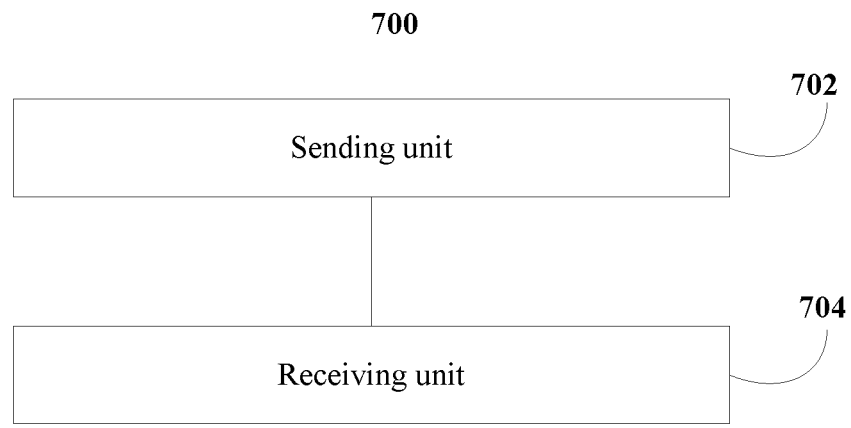
FIG. 7 is a schematic logical structural diagram of a disk lock management apparatus according to an embodiment of the present disclosure.

FIG. 7 is a schematic logical structural diagram of a disk lock management apparatus 700 according to an embodiment of the present disclosure. As shown in FIG. 7, the apparatus 700 includes:

a sending unit 702, configured to send an obtaining request to a data storage system, where the obtaining request is used to request to obtain a disk lock; and a receiving unit 704, configured to receive a release request, where the release request is used to request a first node to release the disk lock.

The sending unit 702 is further configured to send a release message to the data storage system, where the release message is used to release the disk lock.

Optionally, the receiving unit 704 is configured to receive the release request from a second node, where the second node is a node that is to request to obtain the disk lock. After sending the release message to the data storage system, the sending unit 702 may be further configured to send an acknowledgement message to the second node, where the acknowledgement message is used to indicate that the first node has already released the disk lock.

Optionally, the receiving unit 704 is configured to receive the release request from the data storage system.

Figure 8:
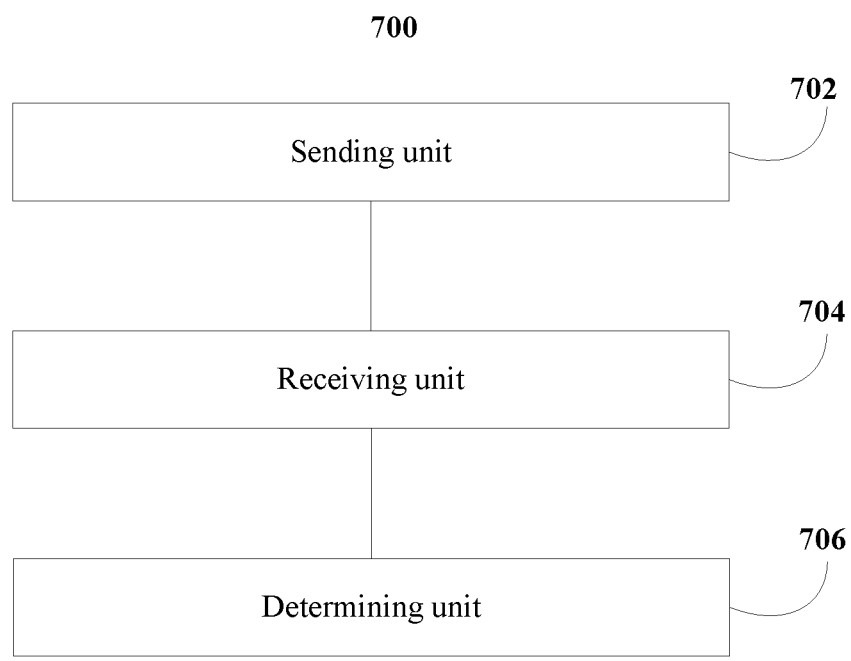
FIG. 8 is a schematic logical structural diagram of a disk lock management apparatus according to an embodiment of the present disclosure.

Optionally, as shown in FIG. 8, the apparatus 700 further includes a determining unit 706. Before the sending unit 702 sends the release message to the data storage system, the determining unit 706 is configured to determine that a time of occupying the disk lock by the first node is greater than a preset threshold.

Specifically, the disk lock includes an occupancy field, the occupancy field is used to record a node that occupies the disk lock, the obtaining request sent by the sending unit 702 carries an identifier of the first node, and the obtaining request is used to write the identifier of the first node into the occupancy field of the disk lock.

It should be understood that, for ease of description, functions of the sending unit 702, the receiving unit 704, and the determining unit 706 in this embodiment of the present disclosure may be integrated into the communications module and/or the disk lock management module shown in FIG. 3, and the processor 302 performs different parts of the communications module and/or the disk lock management module, to implement different functions. However, during specific implementation, the communications module and/or the disk lock management module may be further refined. This is not limited in this embodiment of the present disclosure.

This embodiment of the present disclosure is an apparatus embodiment of the first node. Feature descriptions in the embodiments in FIG. 4 to FIG. 6 are applicable to this embodiment of the present disclosure. Details are not described herein again.

Figure 9:
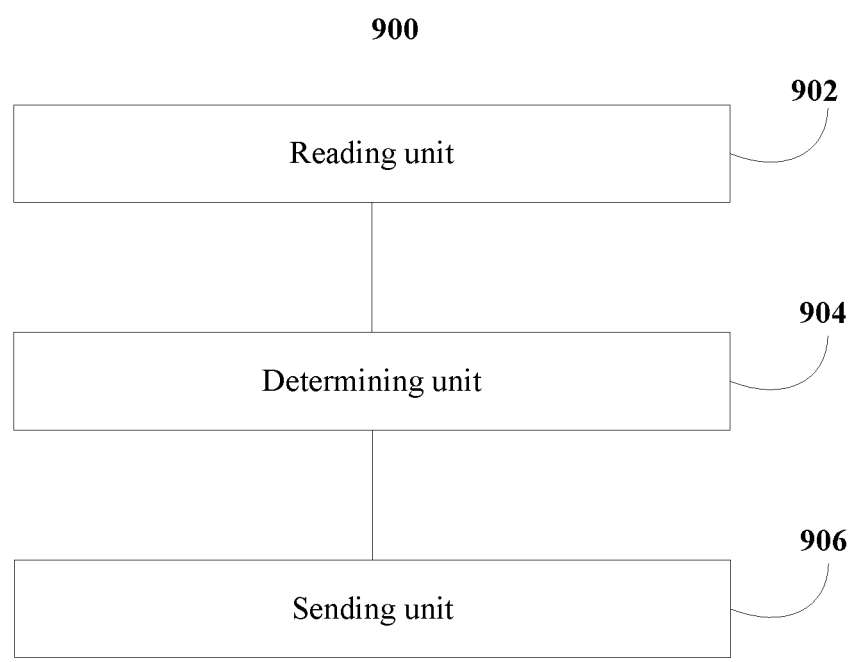
FIG. 9 is a schematic logical structural diagram of a disk lock management apparatus according to an embodiment of the present disclosure.

FIG. 9 is a schematic logical structural diagram of a disk lock management apparatus 900 according to an embodiment of the present disclosure. A resource and a disk lock of the resource are stored in a data storage system, the disk lock includes an occupancy field, the occupancy field is used to record a node that occupies the disk lock, and the node that occupies the disk lock has permission to access the resource. As shown in FIG. 9, the apparatus 900 includes:

a reading unit 902, configured to read the disk lock;

a determining unit 904, configured to determine, based on the occupancy field of the read disk lock, that the disk lock is occupied by a first node; and a sending unit 906, configured to send a release request to the first node, where the release request is used to request the first node to release the disk lock.

Figure 10:
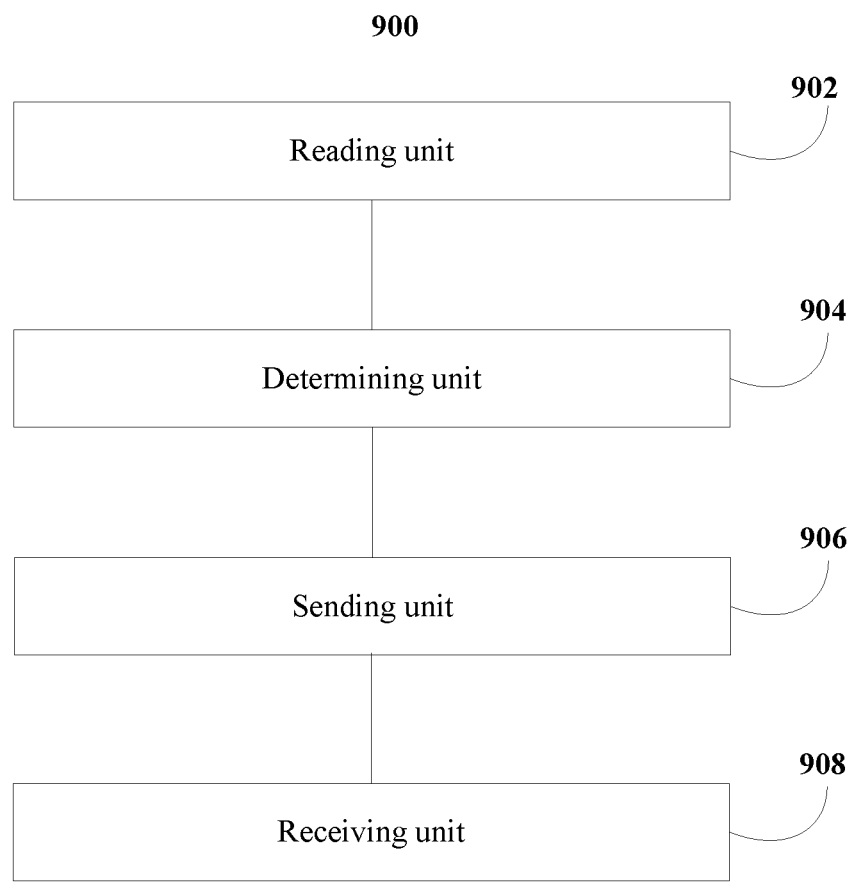
FIG. 10 is a schematic logical structural diagram of a disk lock management apparatus according to an embodiment of the present disclosure.

Optionally, as shown in FIG. 10, the apparatus 900 further includes a receiving unit 908. After the sending unit 906 sends the release request to the first node, the receiving unit 908 is further configured to receive an acknowledgement message sent by the first node, where the acknowledgement message is used to indicate that the first node has already released the disk lock.

After sending the release request to the first node, the sending unit 906 is further configured to send an obtaining request to the data storage system, where the obtaining request is used to request to obtain the disk lock.

It should be understood that, for ease of description, functions of the reading unit 902, the determining unit 904, the sending unit 906, and the receiving unit 908 in this embodiment of the present disclosure may be integrated into the communications module and/or the disk lock management module shown in FIG. 3, and the processor 302 performs different parts of the communications module and/or the disk lock management module, to implement different functions. However, during specific implementation, the communications module and/or the disk lock management module may be further refined. This is not limited in this embodiment of the present disclosure.

This embodiment of the present disclosure is an apparatus embodiment of a second node. Feature descriptions in the embodiments in FIG. 4 to FIG. 6 are applicable to this embodiment of the present disclosure. Details are not described herein again.

In the several embodiments provided in the present disclosure, it should be understood that the disclosed system, device, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not be performed. In addition, the displayed or discussed mutual couplings or direct couplings or communication connections may be implemented using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected based on actual needs, to achieve the objectives of the solutions of the embodiments.

In addition, functional modules in the embodiments of the present disclosure may be integrated into one processing module, or each of the modules may exist alone physically, or two or more modules are integrated into one module. The integrated module may be implemented in a form of hardware, or may be implemented in a form of hardware in addition to a software functional module.

The foregoing integrated module that is implemented in a form of a software functional module may be stored in a computer-readable storage medium. The software functional module is stored in a storage medium and includes several instructions for instructing a computer device (which may be a personal computer, a server, a network device, or the like) to perform some of the steps of the methods described in the embodiments of the present disclosure. The foregoing storage medium includes any medium that can store program code, such as a removable hard disk, a read-only memory, a random access memory, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A disk lock management method, the method comprising:
    sending, by a first node, an obtaining request carrying an identifier of the first node to a data storage system, wherein a disk lock of a resource is stored in the data storage system, and wherein the obtaining request is used to request to obtain the disk lock and to cause the identifier of the first node to be written into an occupancy field of the disk lock in response to there being no other nodes currently occupying the disk lock;
    setting, by the first node, a shortest holding time for the disk lock, wherein the shortest holding time is an amount of time the first node holds the disk lock after a release request is received;
    receiving, by the first node, the release request, wherein the release request causes the first node to request to release the disk lock; and
    after receiving the release request:
        in response to the shortest holding time for the disk lock being set to 0, sending, by the first node, a release message to the data storage system to release the disk lock in response to receiving the release request; or
        in response to the shortest holding time not being set to 0, sending, by the first node, the release message to the data storage system to release the disk lock after the shortest holding time has passed.

2. The method according to claim 1, wherein the receiving, by the first node, the release request comprises:
    receiving, by the first node, the release request from a second node, wherein the second node is a node that requests to obtain the disk lock.

3. The method according to claim 2, wherein after the sending, by the first node, the release message to the data storage system, the method further comprises:
    sending, by the first node, an acknowledgement message to the second node, wherein the acknowledgement message indicates that the first node has released the disk lock.

4. The method according to claim 1, wherein the receiving, by the first node, the release request comprises:
    receiving, by the first node, the release request from the data storage system.

5. A disk lock management apparatus, comprising:
    a memory configured to store instructions; and
    a processor coupled to the memory and configured to execute the instructions to:
        send an obtaining request carrying an identifier of the apparatus to a data storage system, wherein the obtaining request is used to request to obtain a disk lock of a resource, wherein the disk lock is stored in the data storage system and to cause the identifier of the apparatus to be written into an occupancy field of the disk lock in response to there being no other nodes currently occupying the disk lock;
        set a shortest holding time for the disk lock, wherein the shortest holding time is an amount of time the first node holds the disk lock after a release request is received;
        receive the release request, wherein the release request causes the apparatus to request to release the disk lock; and
        after receiving the release request:
            in response to the shortest holding time for the disk lock being set to 0, send a release message to the data storage system to release the disk lock in response to receiving the release request; or
            in response to the shortest holding time not being set to 0, send the release message to the data storage system to release the disk lock after the shortest holding time has passed.

6. The apparatus according to claim 5, wherein the processor is configured to:
    receive the release request from a second node, wherein the second node is a node that requests to obtain the disk lock.

7. The apparatus according to claim 6, wherein the processor is further configured to:
    send an acknowledgement message to the second node, wherein the acknowledgement message indicates that the apparatus has released the disk lock.

8. The apparatus according to claim 5, wherein the processor is configured to:
    receive the release request from the data storage system.

9. A disk lock management system, comprising:
    a data storage system configured to store a disk lock of a resource, wherein a node that occupies the disk lock has permission to access the resource; and
    a first node configured to:
        send a first obtaining request carrying an identifier of the first node to the data storage system, wherein the first obtaining request is used to request to obtain the disk lock and to cause the identifier of the first node to be written into an occupancy field of the disk lock in response to there being no other nodes currently occupying the disk lock;
        set a shortest holding time for the disk lock, wherein the shortest holding time is an amount of time the first node holds the disk lock after a release request is received;
        receive the release request, wherein the release request the first node to request to release the disk lock; and
        after receiving the release request:
            in response to the shortest holding time for the disk lock being set to 0, send a release message to the data storage system to release the disk lock in response to receiving the release request; or
            in response to the shortest holding time not being set to 0, send the release message to the data storage system to release the disk lock after the shortest holding time has passed.

10. The system according to claim 9, further comprising:
a second node, wherein the first node is configured to receive the release request sent by the second node, wherein the second node is a node that requests to obtain the disk lock.

11. The system according to claim 10, wherein after sending the release message to the data storage system, the first node is further configured to send an acknowledgement message to the second node, wherein the acknowledgement message indicates that the first node has released the disk lock.

12. The system according to claim 9, wherein the first node is configured to receive the release request from the data storage system.

13. The system according to claim 9, wherein the second node is configured to:
read the disk lock;
determine, based on the occupancy field of the read disk lock, that the disk lock is occupied by the first node; and
send the release request to the first node.

14. The system according to claim 13, wherein the second node is further configured to send a second obtaining request to the data storage system, wherein the second obtaining request is used to obtain the disk lock.

* * * * *